United States Patent [19]
Yaguchi et al.

[11] Patent Number: 5,903,363
[45] Date of Patent: *May 11, 1999

[54] IMAGE PROCESSING APPARATUS AND METHOD

[75] Inventors: Hiroyuki Yaguchi, Inagi; Ryosuke Miyamoto, Urayasu; Hideaki Shimizu, Yokohama; Yasuhiro Takiyama, Kawasaki; Tadashi Takahashi, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/510,315

[22] Filed: Aug. 2, 1995

[30] Foreign Application Priority Data

Aug. 4, 1994  [JP]  Japan .................................. 6-183408

[51] Int. Cl.$^6$ ................ H04N 1/46; H04N 1/04
[52] U.S. Cl. ................ 358/474; 358/483; 358/486; 358/505; 358/513; 358/514
[58] Field of Search ............................. 358/474, 475, 358/482, 483, 486, 496, 497, 443, 448, 509, 513, 514, 296, 518, 519, 523, 524, 530; 355/319, 320, 23, 24, 26; 382/162, 167

[56] References Cited

U.S. PATENT DOCUMENTS

| | | | |
|---|---|---|---|
| 4,510,523 | 4/1985 | Kurata et al. | 358/75 |
| 4,532,551 | 7/1985 | Kurata et al. | 358/298 |
| 4,719,490 | 1/1988 | Yoshida et al. | 355/4 |
| 4,743,974 | 5/1988 | Lockwood | 358/296 |
| 4,989,075 | 1/1991 | Ito | 348/280 |
| 5,185,661 | 2/1993 | Ng | 358/505 |
| 5,452,108 | 9/1995 | Muramatsu | 358/474 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

An image reading apparatus for scanning an original in different directions is constructed by a light receiving unit to receive a reflection light from the original a transfer unit to transfer charges of the light received by the light receiving unit by using a transfer unit in accordance with the scanning direction a correction unit to correct an image signal outputted from the transfer unit and a control unit to control the correction in the correction unit in accordance with the scanning direction.

45 Claims, 8 Drawing Sheets

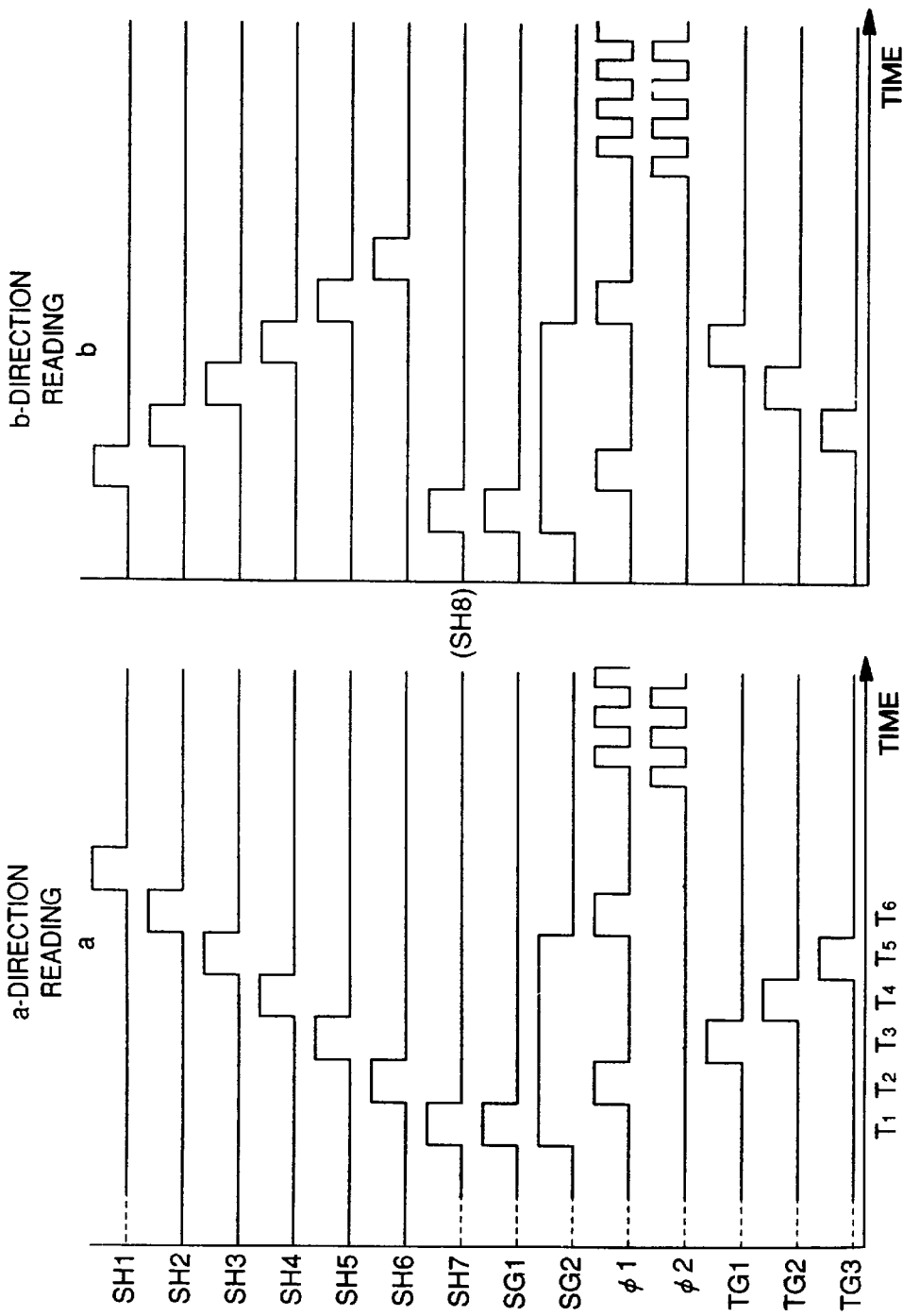

IMAGE PROCESSING APPARATUS AND METHOD

BACKGROUND OF THE INVENTION

1. Field of the Invention

The invention relates to image processing apparatus and method for correcting characteristics of reading means for reading an original.

2. Related Background Art

Generally, in an image forming apparatus, there has been known a method whereby an image of an original is read by an image input unit and converted to an electric signal and an image processing unit executes image processes to the electric signal and, after that, the processed signal is recorded as an image by an output unit such as a laser printer or the like. However, since the electric signal from the image input unit such as a CCD or the like depends on characteristics of the CCD, after the electric signal was corrected to a standard color space, various image processes are executed. According to such a correction, since the characteristics of the image signal from the CCD are always in the same state, an arithmetic operation by preset coefficients can be performed.

According to the conventional method, however, there is a problem such that when the characteristics of the image signal from the CCD are not always in the same state, it is impossible to correct in correspondence to each state.

SUMMARY OF THE INVENTION

The invention is made in consideration of the above problems and it is an object of the invention to provide an image reading apparatus which has light receiving means for receiving a reflection light from an original and transfer means for transferring charges received by the light receiving means by using a transfer unit according to a scanning direction and which scans the original in different directions, wherein image data which accurately conforms with the original is obtained by the image recording apparatus.

To accomplish the above object, according to the first embodiment of the present invention, there is provided an image reading apparatus for scanning an original in different directions, comprising: light receiving means for receiving a light from an original; transfer means for transferring charges received by the light receiving means by using a transfer unit in accordance with the scanning direction; correcting means for correcting an image signal outputted from the transfer means; and control means for controlling the correction in the correcting means in accordance with the scanning direction.

The above and other objects and features of the present invention will become apparent from the following detailed description and the appended claims with reference to the accompanying drawings.

BRIEF DESCRIPTION OF THE DRAWINGS

FIGS. 8A and 8B are timing charts in the reading operation of the TDI sensor in the embodiment.

DETAILED DESCRIPTION OF THE PREFERRED EMBODIMENT

An embodiment of the invention will now be described in detail hereinbelow with reference to the drawings.

Figure 1:
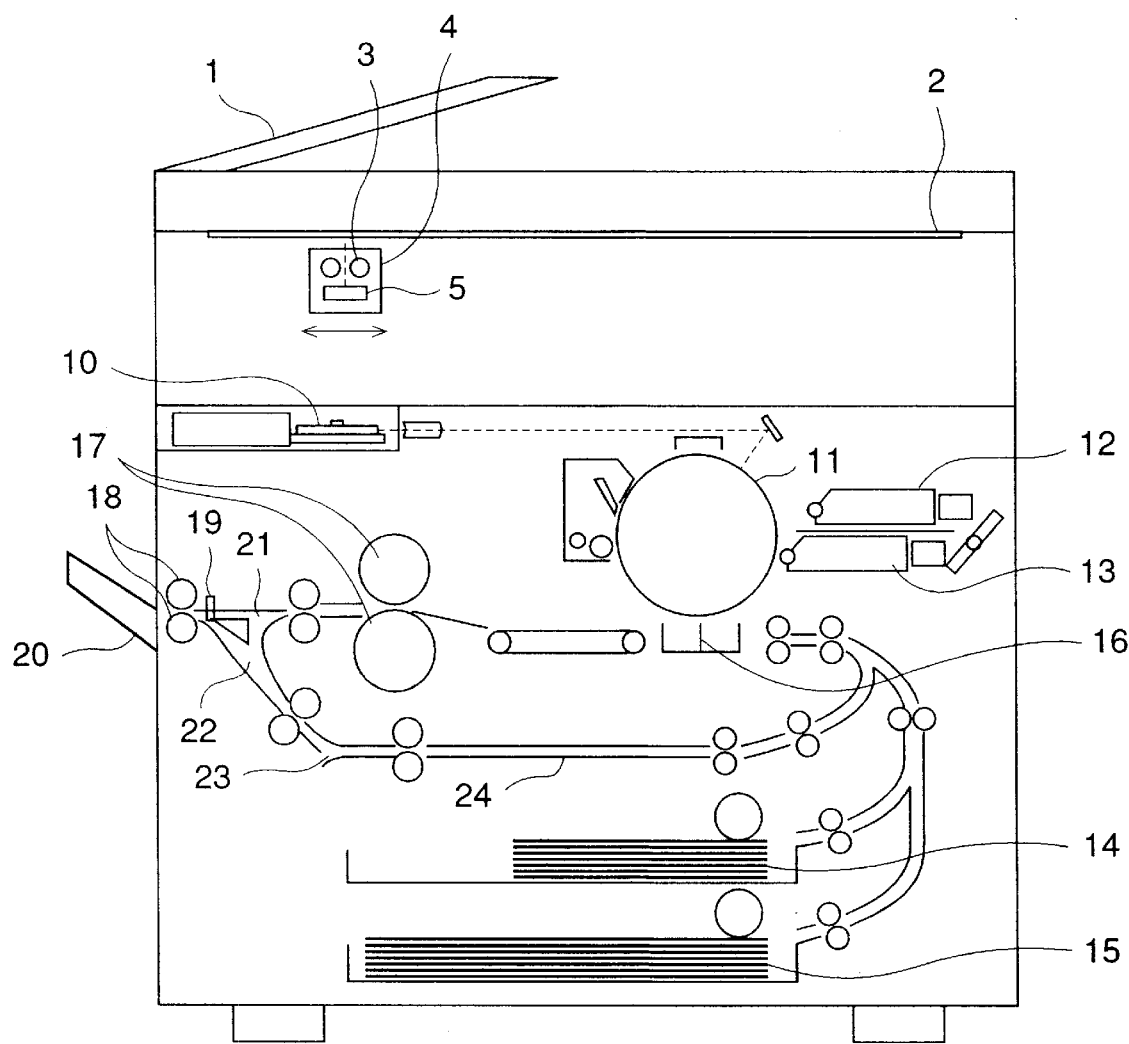
FIG. 1 is a cross sectional view showing an example of a structure of an image processing apparatus of the invention.

FIG. 1 is a diagram showing a construction of an image processing apparatus according to the embodiment.

In FIG. 1, reference numeral 1 denotes an original feeder serving as original feeding means for feeding originals put in the original feeder one by one or for continuously feeding the originals every two originals to a predetermined position on an original supporting glass plate 2. Reference numeral 4 denotes a scanner constructed by a lamp 3, a CCD 5, and the like. When the original is put on the glass plate 2 by the original feeder 1, the scanner main body is reciprocatingly scanned and a reflection light of the original is read by the CCD 5. Since the scanner 4 can read the image in both of the scan in the going direction and the scan in the returning direction, the image can be read at a high speed.

Reference numeral 10 denotes an exposure control unit constructed by a laser scanner. A laser beam modulated on the basis of image data that is outputted from an image signal control unit 1023 (refer to FIG. 2) of a controller CONT is irradiated onto a photosensitive material 11 by the exposure control unit 10. Reference numerals 12 and 13 denote developing units each for developing an electrostatic latent image formed on the photosensitive material 11 by using a developing agent (toner) of a predetermined color, thereby forming a visible image. Reference numerals 14 and 15 denote transfer paper stacking units in each of which recording media of a fixed size are stacked and enclosed. The recording media are fed one by one to a resist arranging position by the driving of a feed roller and a timing of an image edge is matched with a timing of an image to be formed on the photosensitive material 11. In such a timing matching state, the recording medium is again fed.

Reference numeral 16 denotes a transfer separation charging unit (or a transfer unit). After the toner image developed on the photosensitive material 11 was transferred to a transfer paper, it is separated from the photosensitive material 11 and is fixed by a fixing unit 17 through a convey belt. Reference numeral 18 denotes an ejecting roller for ejecting out the transfer paper after completion of the image formation and stacking onto a tray 20. Reference numeral 21 denotes a direction flapper for switching the conveying direction of the transfer paper after completion of the image formation to the direction of either one of an ejection port and an internal conveying path, thereby preparing for a multiple/two-sided image forming process.

The image formation to the recording medium will now be described hereinbelow. An image signal inputted to the CCD 5, namely, an input signal from an image reader control unit 1022, which will be explained hereinlater, is processed by the image signal control unit 1023 which is controlled by a CPU circuit unit 1025 and is supplied to a printer control unit 1024. The signal supplied to the printer control unit 1024 is converted to a photosignal by the exposure control unit 10 and irradiates the photosensitive material 11 in accordance with the image signal. The latent image formed on the photosensitive material 11 by the irradiation light is developed by the developing unit 12 or 13. A transfer paper is conveyed from the transfer paper stacking unit 14 or 15 at a timing matched with the timing of the latent image. The developed image is transferred to the transfer paper by the transfer unit 16. The transferred image is fixed onto the transfer paper by the fixing unit 17. After that, the paper is ejected to the outside of the apparatus by the ejecting roller 18.

In the two-sided recording mode, after the transfer paper passed through an ejection sensor 19, the ejecting roller 18 is rotated in the direction opposite to the ejecting direction. At the same time, the flapper 21 is lifted up, thereby storing the copied transfer paper to an intermediate tray 24 through conveying paths 22 and 23. In the back-side recording operation which will be executed subsequently, the transfer paper stored in the intermediate tray 24 is fed and a next image is transferred and copied to the back side of the transfer paper.

In the multiple recording mode, the flapper 21 lifted up, thereby storing the copied transfer paper to the intermediate tray 24 through the conveying paths 22 and 23. In the multiple recording operation which will be executed subsequently, the transfer paper stored in the intermediate tray 24 is fed and the multiple transfer copy is executed.

Figure 6:
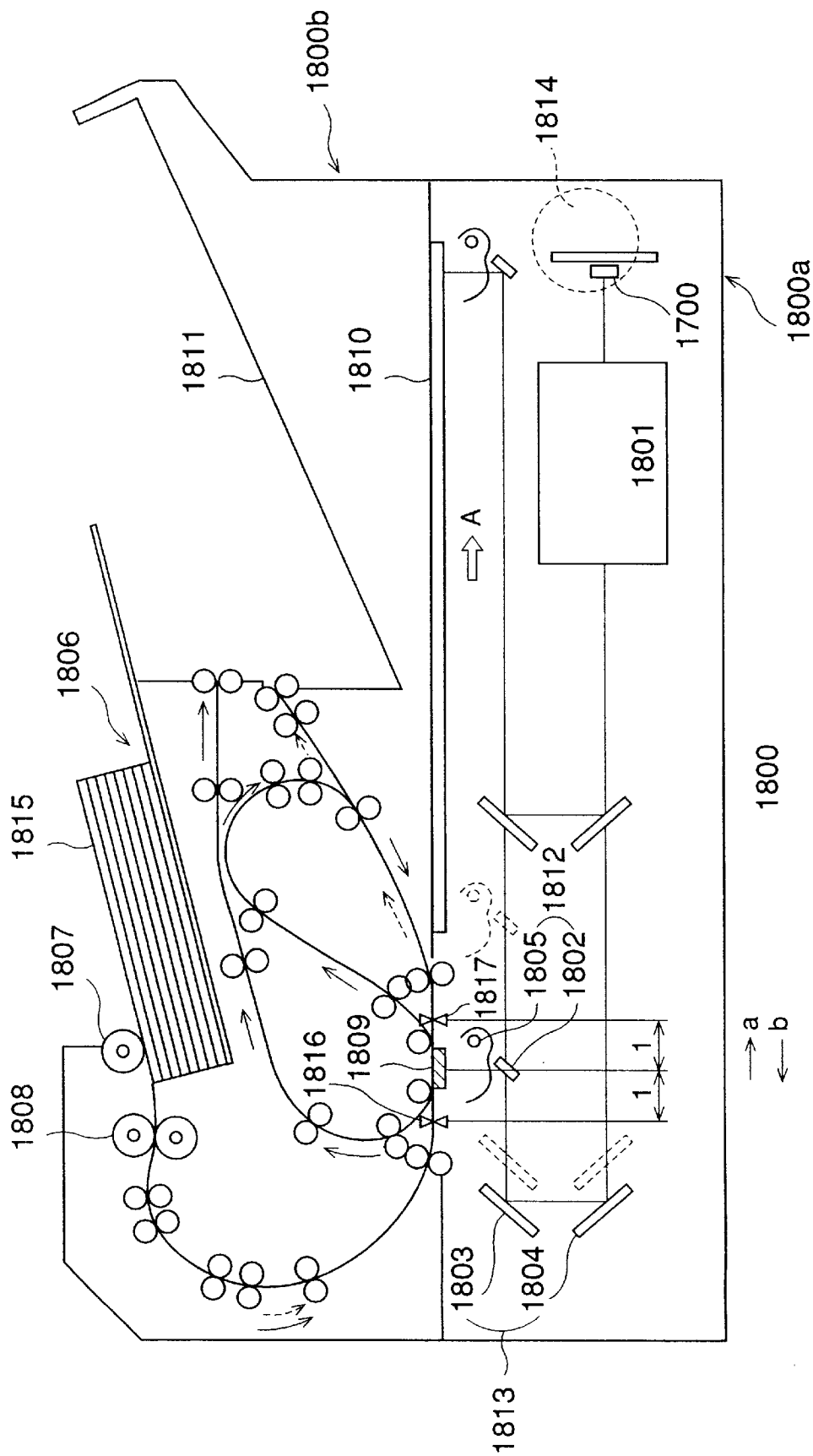
FIG. 6 is a diagram showing an example of a construction of a scanner.

A construction of the scanner unit will now be specifically explained hereinbelow with reference to FIG. 6.

A scanner 1800 is constructed by a scanner main body 1800*a* and a document feeder 1800*b*.

Reference numeral 1810 denotes a platen glass on which an original is put; 1805 a halogen lamp for exposing the original; and 1802 a first reflection mirror. A mirror unit 1812 is constructed by those component devices.

Reference numeral 1803 denotes a second reflection mirror and 1804 indicates a third reflection mirror. A mirror unit 1813 is constructed by those devices.

Reference numeral 1801 denotes a lens unit for reducing and forming a reflection light image from the original which was exposed and scanned by the halogen lamp 1805 onto a color CCD linear sensor 1700 as a reduced image. Reference numeral 1809 denotes a platen glass for sidelong reading which is used in case of sidelong reading the original by using the document feeder 1800*b*.

In the case where the original is put onto the platen glass 1810 and the mirror units 1812 and 1813 are moved and scanned by a stepping motor 1814 in the direction (sub scanning direction) shown by an arrow (a) at a scanning speed of 2:1 and the original is read, the movement of the mirror units 1812 and 1813 is started from positions shown by broken lines in the diagram.

The document scanner 1800*b* is constructed by the following component devices.

Reference numeral 1806 denotes an input tray of originals 1815; 1807 a pickup roller of the originals; 1808 a feed roller to feed the original. Further, ejecting rollers are provided.

In this case, the originals are put on the input tray 1806 with the surface upside-up. In case of reading one side, the original is sent to the feed roller by the pickup roller 1807 and is fed by the feed roller in accordance with the reading timing of the original and is conveyed in the direction shown by an arrow of a broken line. When the original passes on the platen glass for sidelong reading, the reflection light image is formed as a reduced image onto the color CCD linear sensor 1700 through the mirror units 1812 and 1813 and lens unit 1801.

In case of reading a two-sided original, the original fed by the feed roller is conveyed in the direction shown by an arrow of a solid line. After the surface of the original passed through the reading position of the platen glass for sidelong reading and the image was read, the original is reversed along the conveying path. An image on the back side of the original is read from the direction opposite to the reading direction at the time when the surface image is read. After that, the original is ejected out to an ejecting tray 1811 in a manner similar to the case of the reading of the one-sided original.

In this instance, the scanning direction of the image formed on the color CCD linear sensor 1700 is set to the direction shown by an arrow (a) when the front side is read and is set to the direction shown by an arrow (b) when the back side is read.

Figure 2:
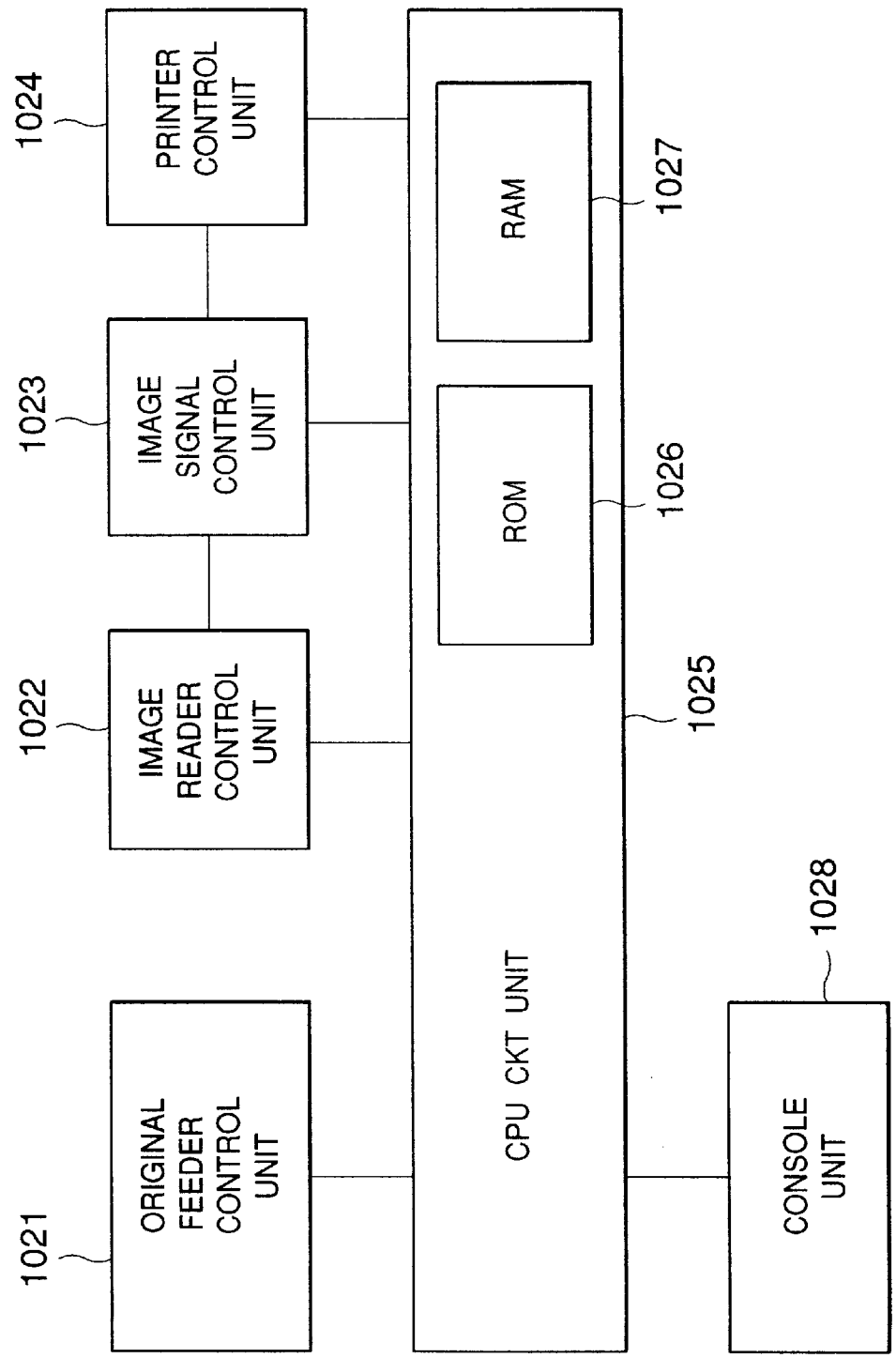
FIG. 2 is a block diagram for explaining an example of a construction of a COUNT of a controller in FIG. 1.

FIG. 2 is a block diagram for explaining an example of a construction of the controller CONT. Reference numeral 1025 denotes the CPU circuit unit which has an ROM 1026 and an RAM 1027 therein and integratedly controls a processing timing and processing contents in each unit on the basis of control programs stored in the ROM 1026 and a mode set by a console unit 1028.

Reference numeral 1021 denotes an original feeder control unit for controlling in a manner such that the originals put in the original feeder are fed one by one or are continuously fed every two originals to a predetermined position on the original supporting glass plate 2, or the like.

The image reader control unit 1022 is constructed by the CCD 5 and the like and outputs the analog image signal which was photoelectrically converted to the image signal control unit 1023. A signal indicative of the moving direction of the scanner is inputted from the image reader control unit 1022 to the image signal control unit 1023. The printer control unit 1024 drives the exposure control unit 10 on the basis of the video signal that is outputted from the image signal control unit 1023, thereby irradiating the laser beam to the photosensitive material 11. The console unit 1028 is provided with an operation panel having keys for setting an image forming mode or an image reading mode, a display, and the like.

As modes to be set, for example, there are a two-sided reading mode, a one-sided reading mode, and the like.

Figure 3:
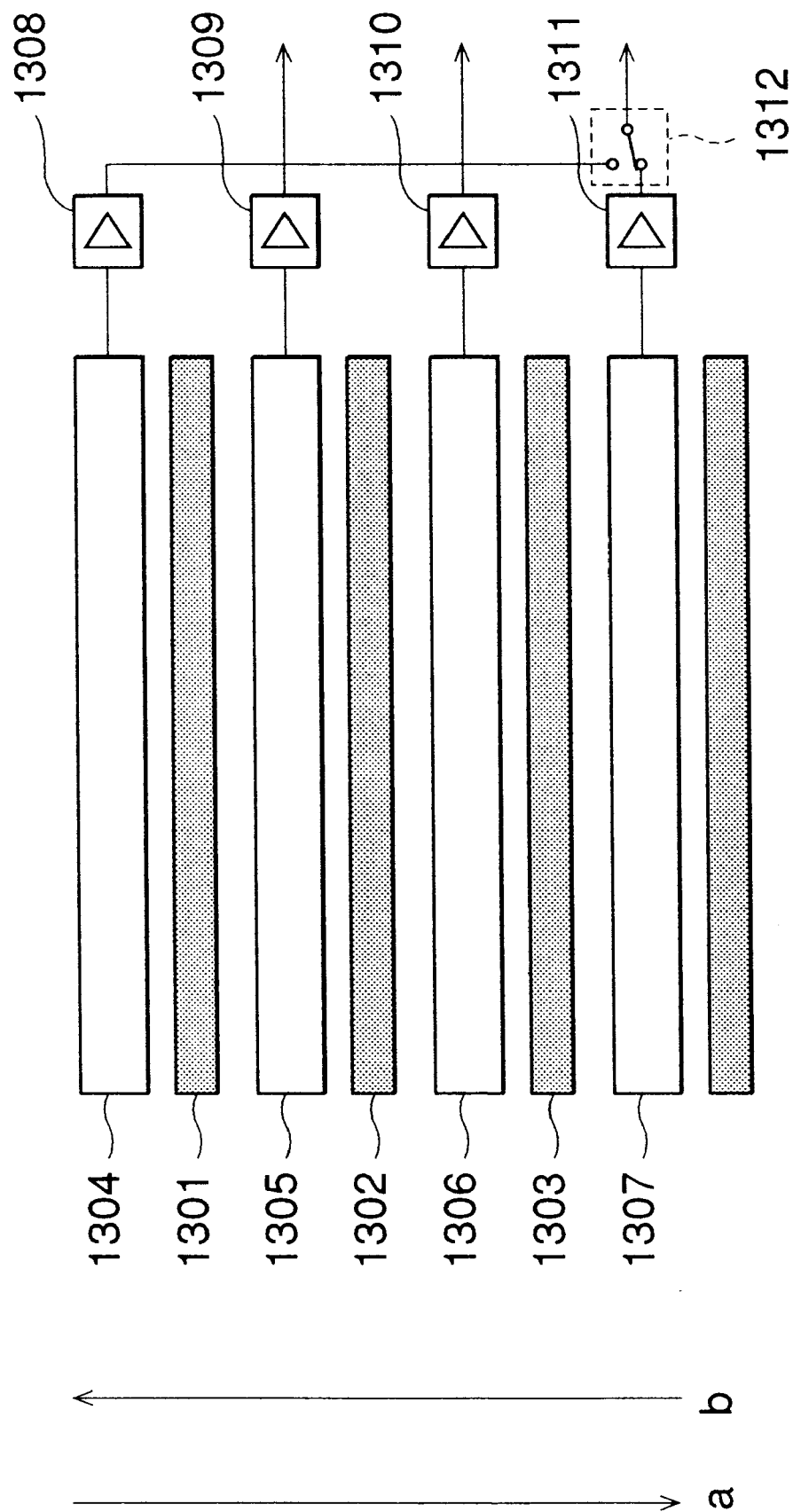
FIG. 3 is a constructional diagram showing an outline of a TDI.

FIG. 3 is a diagram showing an outline of a construction of a sensor which is used in the image reader control unit 1022.

In the diagram, (a) and (b) indicate the moving directions of the scanner. In the embodiment, the (a) direction is set to the scanning direction of the going path (when the front side is read) and the (b) direction is set to the scanning direction of the return path (when the back side is read). Reference numerals 1301, 1302, and 1303 denote photodiodes of red, blue, and green; and 1304, 1305, 1306, and 1307 indicate CCD analog shift registers for sequentially transferring the charges from the photodiodes. Those CCD analog shift registers have characteristics when transferring the different charges of 1304, 1305, 1306, and 1307, respectively. Reference numerals 1308, 1309, 1310, and 1311 denote preamplifiers for amplifying the transferred charges and outputting; and 1312 indicates a switch for selecting either one of outputs of the preamplifiers 1308 and 1311 on the basis of the information indicative of the scanning direction which is inputted from the CPU circuit section 1025.

The operation when the scanner is moving in the (a) direction will be first described. The charges derived by the photodiodes 1301, 1302, and 1303 are transferred through the CCD analog shift registers 1305, 1306, and 1307, respectively. After that, the transferred charges are amplified by the preamplifiers 1309, 1310, and 1311 and are outputted, respectively. In this instance, the switch 1312 is connected to the output from the preamplifier 1311.

The operation when the scanner is moving in the (b) direction will now be described. In a manner similar to the scan in the (a) direction, the charges corresponding to the original image are obtained by the photodiodes 1301, 1302, and 1303 of red, blue, and green. The charges obtained by the photodiodes 1301, 1302, and 1303 are transferred by using the CCD shift registers 1304, 1305, and 1306 different from those in the scan in the (a) direction. After that, the transferred charges are amplified by the preamplifiers 1308, 1309, and 1310 and are outputted, respectively. In this instance, the switch 1312 is connected to the output from the preamplifier 1308.

Since the shift register to transfer the charges is selected on the basis of the moving direction (main scanning direction) of the scanner as mentioned above, the charges can be efficiently transferred.

Consequently, the images of both sides can be efficiently executed at a high speed.

A construction of the sensor of the time delay and integration (TDI) type used on the basis of the foregoing outline in the embodiment will now be specifically explained with reference to FIG. 7.

The TDI sensor has photoelectric converting means of the linear image sensor by the number corresponding to a plurality of lines and sequentially synthesizes output signals of the photoelectric converting means of the plurality of lines synchronously with the reading operation of the scanner having such a line sensor. Thus, an output signal that is larger by the number of times as many as the number of lines of the photoelectric converting means which the line sensor has can be obtained.

Therefore, the high-speed image reading operation which cannot be realized by the conventional 3-line sensor because of the problem of the accumulating time of the light quantity can be performed.

Reference numeral 100 denotes a color CCD linear image sensor of the TDI type; and 101, 102, and 103 indicate CCD linear sensor units of red, blue, and green.

Reference numerals 102a to 102c denote linear photodiode arrays each having an on-chip color filter of red; and 103a to 103c and 104a to 104c indicate linear photodiode arrays having on-chip color filters of blue and green in a manner similar to the linear photodiode arrays 102a to 102c.

Reference numerals 105a and 105b and 108a and 108b denote CCD shift registers for horizontally transferring the charges generated in the linear photodiode arrays 102a to 102c to output units 109a and 109b and 130a and 130b, respectively. The CCD shift registers 105a and 105b are used to read in the (a) direction (front side) (direction shown by arrows of solid lines in FIG. 7). The output units 130a and 130b are used to read in the (b) direction (back side) (direction shown by arrows of broken lines in FIG. 7).

The CCD shift registers 105a and 105b are also the CCD shift registers for horizontally transferring (for reading in the direction opposite to that in case of blue) the charges generated in the linear photodiode arrays 103a to 103c to the output units 109a and 109b.

Reference numerals 106a and 106b denote CCD shift registers for transferring the charges generated in the linear photodiode arrays 103a to 103c to output units 110a and 110b. The CCD shift registers 106a and 106b are used for reading in the (a) direction of blue.

The CCD shift registers 106a and 106b are also the CCD shift registers for outputting the charges generated in the linear photodiode arrays of green 104a to 104c (for reading in the direction opposite to that in case of green).

Reference numerals 107a and 107b denote CCD shift registers for horizontally transferring the charges generated in the linear photodiode arrays of green 104a to 104c to output units 111a and 111b.

Reference numerals 112, 113, and 114 denote shift gates SH1, SH2, and SH3 for transferring the charges generated in the linear photodiode array 102a to the linear photodiode array 102b at the next stage, thereby synthesizing with the charges generated in the linear photodiode array 102b. When reading in the (a) direction, the shift gates SH1 (112), SH2 (113), and SH3 (114) are sequentially made operative, thereby transferring the charges in the direction shown by arrows of solid lines. However, when reading in the (b) direction, the operating order of the shift gates SH1 to SH3 (112 to 114) is opposite to that upon reading in the (a) direction.

Namely, the shift gates are made operative in accordance with the order of SH3 (114)→SH2 (113)→SH1 (112). Reference numerals 115 to 117 denote shift gates SH4 to SH6 for transferring the charges in the vertical direction, thereby synthesizing the charges generated between the linear photodiode arrays 102b and 102c in a manner similar to the above. The operating order upon reading in the (a) direction is set to SH4→SH5→SH6. The operating order upon reading in the (b) direction is set to SH6→SH5→SH4.

Reference numeral 118 denotes a shift gate SH7 for transferring the charges generated in the linear photodiode array 102c to the horizontal CCD shift registers 105a and 105b synchronously with a reading speed of the scanner. Reference numerals 119 and 120 denote switch gates SG1 and SG2 for sequentially transferring the charges of the linear photodiode array 102c which were transferred by the shift gate SH7 (118) to the horizontal CCD shift registers 105a and 105b every pixel. The charges of the odd-number pixels are transferred to the horizontal CCD shift register 105b by the switch gate SG1. The charges of the even-number pixels are transferred to the horizontal CCD shift register 105a by the switch gate SG2 (120).

Reference numerals 121 to 123 denote transfer gates TG1 to TG3 for transferring the charges between the horizontal CCD shift registers 105a and 105b. In a manner similar to the transfer of the charges between the linear photodiodes mentioned above, by changing the operating order upon reading in the (a) direction and upon reading in the (b) direction to TG1→TG2→TG3 and TG3→TG2→TG1, respectively, the transfer direction can be switched to the forward or reverse direction ((a) direction: arrows of the solid lines, (b) direction: arrows of the broken lines).

The horizontal CCD shift registers 105a and 105b are two-phase driven and two registers of $\phi 1$ and $\phi 2$ are generally alternately connected as is well known. By alternately applying pulses to those two registers, potentials of the CCD registers are changed and the charges are sequentially transferred in the directions of the output units (in this example, directions of 109a and 109b). However, it is now assumed that in the transfer between the registers of the transfer gates TG1 to TG3 mentioned above, the transfer is executed by using the register $\phi 1$ in those two registers.

Reference numeral 124 denotes a shift gate SH8 for transferring the charges of the linear photodiode array 102a to the CCD shift registers 108a and 108b synchronously with the reading speed of the scanner. Reference numerals 125 and 126 denote switch gates SG1 and SG2 for sequentially transferring the charges of the shift gate SH8 to the CCD shift registers 108a and 108b every pixel. The charges of the odd-number pixels are transferred to the CCD shift register 108a by the switch gate SG1. The charges of the even-number pixels are transferred to the CCD shift register 108b by the switch gate SG2.

Reference numerals 127 to 129 denote transfer gates TG1 to TG3 for transferring the charges between the CCD shift registers 108a and 108b. The operations of those transfer gates are similar to those mentioned above.

Figure 7:
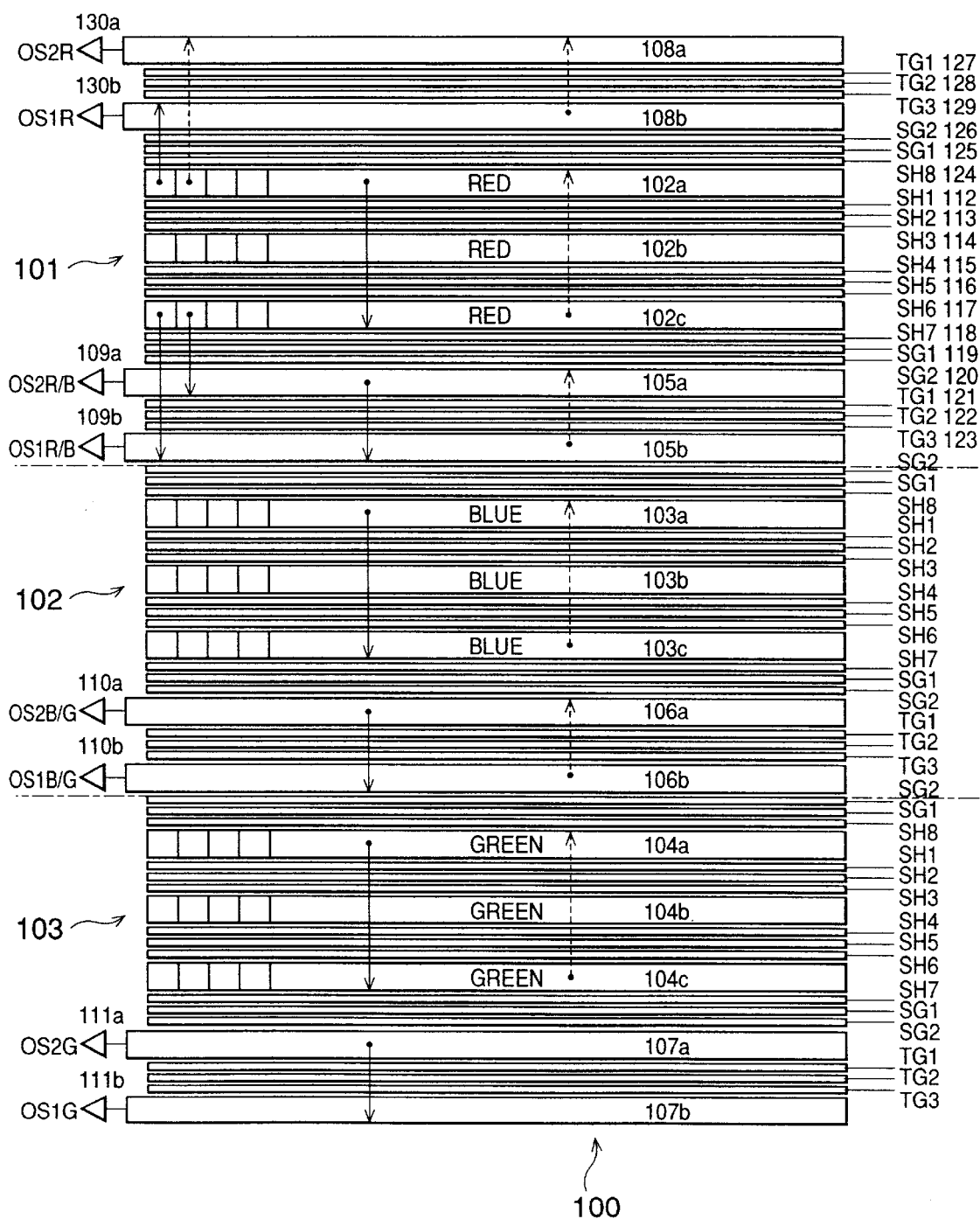
FIG. 7 is a diagram showing an example of a construction of a TDI sensor.

FIGS. 8A and 8B show timing charts of the color CCD linear image sensor 100 in FIG. 7.

Upon reading in the (a) direction of FIG. 8A, SH7, SG1, and SG2 are set to the high level "H" at a timing of T1 and the charges of the linear photodiode array 102c are transferred to the shift gates SG1 (119) and SG2 (120). In a state of T2, SG1 is changed from "H" to "L" and φ1 is changed from "L" to "H". The charges of the shift gate SG1 (119) are transferred to the register φ1 of the CCD shift register 105a.

At a timing of T3, [φ1: "H" "L"] and [TG1: "H"], so that the charges are transferred from the register of φ1 to the transfer gate TG1 (121).

Similarly, at time T4, [TG1: "H" "L"] and [TG2: "L"→"H"]. At time T5, [TG2: "H"→"L"] and [TG3: "L"→"H"]. The charges are sequentially transferred from the transfer gate TG1 (121) to TG2 (122) and TG3 (123).

At T6, the switch gate SG2 (120) is again changed from "H" to "L" and φ1 is again changed from "L" to "H", so that the charges of the switch gate SG2 (120) are transferred to the register φ1 of the CCD shift register 105a. At the same time, since the transfer gate TG3 (123) is changed from "H" to "L", the charges of the transfer gate TG3 (123) are transferred to the register φ1 of the CCD shift register 105b.

The transferring operations of the shift gates SH1 to SH7 regarding the TDI operation are executed as shown in the diagram. Namely, the charges are sequentially transferred from SH1 to SH7 every shift gate per one period and the charges are transferred to the CCD shift registers 105a and 105b at the seventh period for the first time and are read out as an output.

In case of the transfer in the (b) direction in FIG. 8B, in place of the shift gate SH7 (118), the shift gate SH8 (124) operates and the operation timings of the shift gates SH1 to SH6 (112 to 117) and transfer gates TG1 to TG3 (121 to 123) are merely set to the orders opposite to those in case of the transfer in the (a) direction in FIG. 8A. The other remaining construction is similar to that in case of the transfer in the (a) direction.

Although the CCD linear image sensor unit 101 of red of the color CCD linear image sensor 100 has been described above, since the operations of the units shown by the same reference numerals in the CCD linear image sensor units 102 and 103 of blue and green are substantially the same as those of the CCD linear image sensor unit 101 of red, their descriptions are omitted here.

Figure 4:
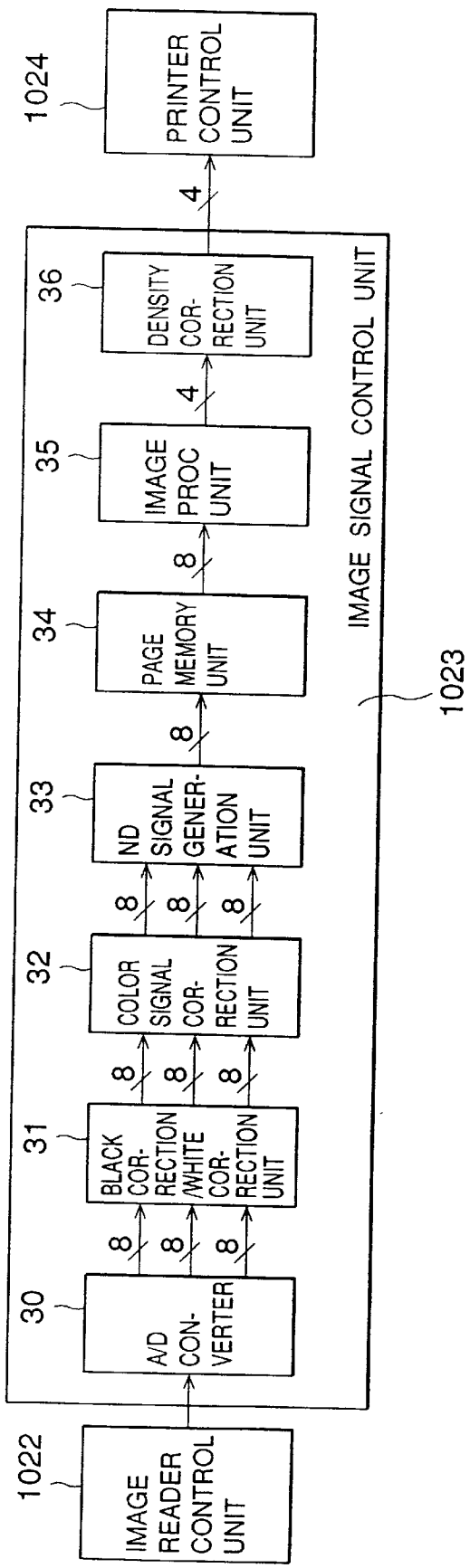
FIG. 4 is a block diagram showing an example of an image signal control unit in FIG. 2.

FIG. 4 is a detailed diagram showing an example of the image signal control unit 1023.

In FIG. 4, analog image signals converted to electric signals of RGB by the image reader control unit 1022 are converted to digital signals by an A/D converter 30 (in the embodiment, each digital signal consists of eight bits).

A black correction/white correction unit 31 executes a correction (shading correction) of the black level and white level in order to correct the characteristics of the photo-diodes 1301, 1302, and 1303 corresponding to the colors of RGB. A color signal correction unit 32 corrects the characteristics of the CCD analog shift registers 1304, 1305, 1306, and 1307 in correspondence to the color signals of RGB which were inputted, thereby allowing the input RGB signals to show a color which accurately conforms with the color of the original.

Therefore, the image signals are converted by the black correction/white correction unit 31 and color signal correction unit 32 to the RGB color signals in which the characteristics of the image reader control unit 1022 were corrected.

In an ND signal generation unit 33, the RGB signals corrected by the color signal correction unit 32 are added and the resultant signal is divided into ⅓ and is outputted as a luminance signal Dout.

$$Dout=(Rin+Gin+Bin)/3$$

The luminance signal Dout is sequentially accumulated into a page memory unit 34.

As for the luminance signal stored in the page memory unit 34, since the scanner reads the image in a reciprocating manner and the charges obtained in each photodiode are transferred by using the CCD shift registers based on the transfer direction, and since the scanning direction of the image data read by the scan in the direction of the returning path is reversed for that of the scan in the direction of the outgoing path, the image data is stored in a state in which the order of the data derived by the scanner is reversed. Therefore, as for the image data obtained by the scan in the returning direction and accumulated as reversed image data, the reading direction from the page memory unit 34, namely, the reading order of the data is reversed.

Consequently, even when the scanner scans in any one of the going direction and the returning direction, the image data of the same nature, namely, the same order can be obtained as an output of the page memory.

An image processing unit 35 inputs upper four bits of the image data stored in the page memory unit 34.

The image processing unit 35 executes processes such as zoom for enlarging/reducing the image, designation of negative/positive, trimming/masking, various filtering processes, and the like.

After that, a luminance-density conversion is executed by a density correction unit 36, a density correction in a printer is executed, and the corrected signal is transmitted to the printer control unit 1024 of the laser printer.

The detailed operation of the color signal correction unit 32 will now be described hereinbelow. The color signal correction unit 32 outputs the RGB image signals in which the characteristics of the image reader control unit 1022 were corrected from the RGB image signals and the signal indicative of the scanning direction. A terminology "correction" denotes that the data is converted to the image data which doesn't depend on the characteristics of the image reader control unit 1022. Specifically, by converting the RGB signals which depend on the filter colors of the photodiodes to the standard RGB signals and by outputting the RGB signals which don't depend on the characteristics of the CCD analog shift registers, even in either scans in forward and backward directions, the output color is identical. Practically speaking, the color signal correction unit 32 corrects in a manner such that a distortion regarding a color tone occurring due to the characteristics of the combination of the photodiode corresponding to each of RGB in each of the scanning directions of the going direction and the returning direction and the CCD analog shift register is switched on the basis of the scanning direction as shown below, thereby correcting. First, when the original is scanned in the (a) direction, the following matrix arithmetic operation is executed to the input image signals of Ri, Bi, and Gi, thereby obtaining output image signals Ro, Bo, and Go.

$$\begin{pmatrix} Ro \\ Bo \\ Go \end{pmatrix} = \begin{pmatrix} a11 & a12 & a13 \\ a21 & a22 & a23 \\ a31 & a32 & a33 \end{pmatrix} \begin{pmatrix} Ri \\ Bi \\ Gi \end{pmatrix}$$

where, a11, a12, . . . , and a33 denote color signal correction coefficients.

When the original is scanned in the (b) direction, by executing the following matrix arithmetic operation to the input image signals of Bi, Gi, and Ri, the output image signals Ro, Bo, and Go are derived.

$$\begin{pmatrix} Ro \\ Bo \\ Go \end{pmatrix} = \begin{pmatrix} a11' & a12' & a13' \\ a21' & a22' & a23' \\ a31' & a32' & a33' \end{pmatrix} \begin{pmatrix} Bi \\ Gi \\ Ri \end{pmatrix}$$

where, a11', a12', . . . , a33' denote color signal correction coefficients.

Figure 5:
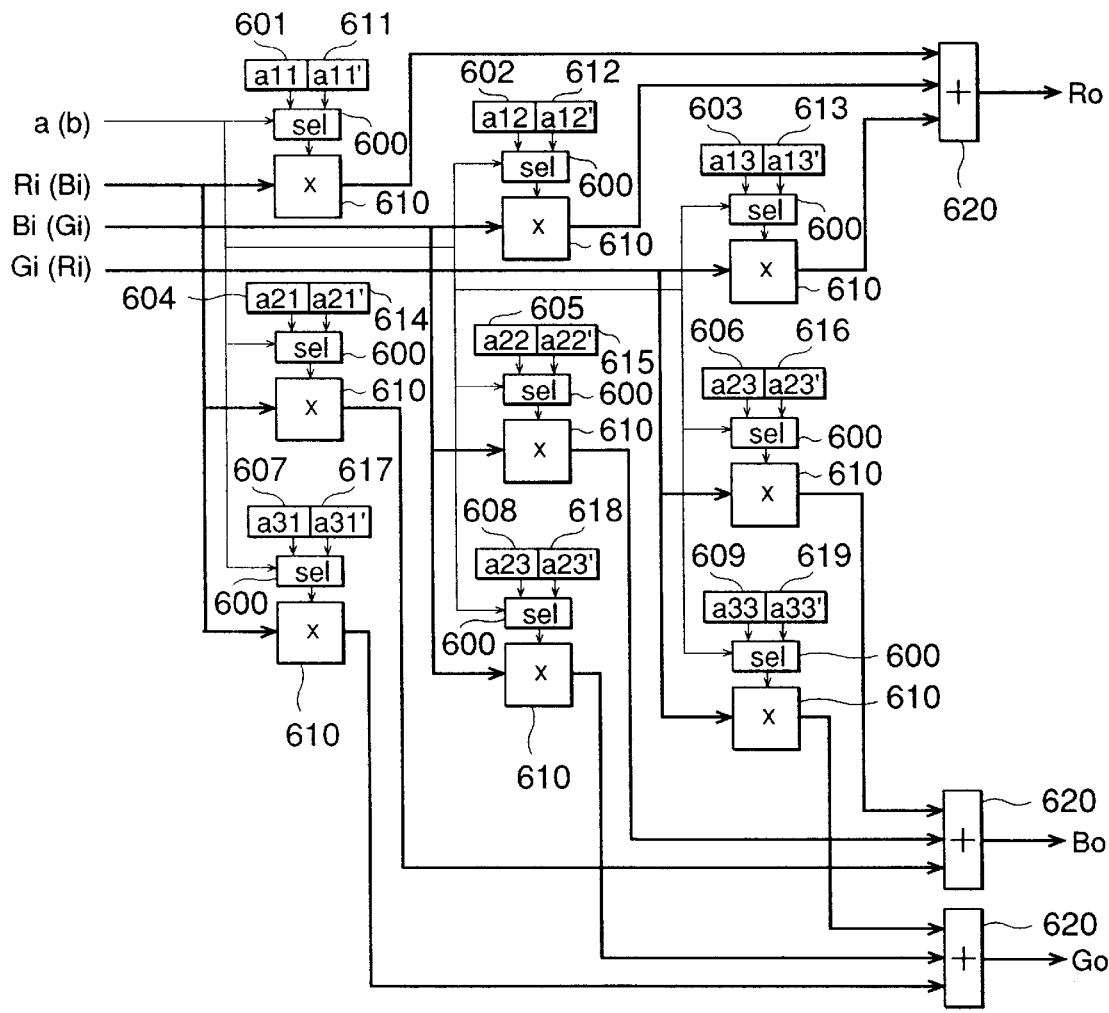
FIG. 5 is a block diagram showing an example of a color signal correction unit according to the invention.

FIG. 5 shows the details of the color signal correction unit 35 to execute the above two matrix arithmetic operations. a(b) denotes the scanning direction (a) or (b); Ri, Bi, and Gi indicate input image signals when the original is scanned in the (a) direction; input image signals surrounded by ( ) show input signals when the original is scanned in the (b) direction; Ro, Bo, and Go the output image signals which were corrected; 601 to 609 and 611 to 619 indicate registers in which the color signal correction coefficients a11 to a33 and a11' to a33' have been set; and 600 a selector to switch those coefficients in accordance with the signal indicative of the scanning direction. For example, when the original is scanned in the (a) direction, a11 to a33 are outputted from the selector. When the original is scanned in the (b) direction, a11' to a33' are outputted from the selector. Reference numeral 610 denotes a multiplier to multiply each input image signal and the color signal correction coefficients which are outputted from the selector. Reference numeral 620 denotes an adder for adding inputs from the multiplier 610 and outputting the sum, so that the input image signal can be corrected.

In the embodiment, control signals are outputted from the CPU circuit unit 1025 to each unit so as to synchronize the conveying timing of the feeder unit, switching timing of the switch 1312 of the image reader control unit, and the coefficient switching timing of the color signal correction unit 32 of the image signal control unit 1023.

Therefore, the coefficients can be switched in accordance with the image signals from the CCD.

Since the coefficients can be switched in accordance with the coefficients of the image signals from the CCD, accordingly, there is no need to reset and the real-time performance is not lost.

Further, since it is sufficient to use one correction unit, the correction can be performed without increasing the costs.

Although the embodiment has been described with respect to the case of the switching between two kinds of coefficients, by applying the embodiment, any kinds of coefficients can be easily switched.

In the embodiment, although the correction has been performed by using the matrix arithmetic operations, the invention is not limited to such a method. For example, by changing an LUT or the like in accordance with the scanning direction, the correction can be also performed.

The correcting method as mentioned above can be also applied to a case of switching a plurality of kinds of color spaces or to another correction such as shading or the like.

According to the embodiment as mentioned above, since the correction is performed in accordance with a state of the reading means, the image data which accurately conforms with the original can be obtained.

Since the transfer means suitable for the transferring direction of the reading means is selected, the image data can be efficiently transferred.

Since the correction is performed by using the coefficients based on the scanning direction of the original, the image data which accurately conforms with the original can be obtained irrespective of the scanning direction of the original.

Although the invention has been described with respect to the preferred embodiment, the invention is not limited to the foregoing embodiment but many modifications and variations are possible within the spirit and scope of the appended claims of the invention.

What is claimed is:

1. An image reading apparatus for scanning an original in different scanning directions, comprising:
   light receiving means for receiving light from said original;
   transfer means for transferring charges of the light received by said light receiving means, the transfer means for executing a transfer operation selected in accordance with a scanning direction of the apparatus;
   correcting means for correcting a color tone of an image signal output from said transfer means; and
   control means for controlling correction performed by said correcting means in accordance with said scanning direction.

2. An apparatus according to claim 1, wherein said different scanning directions comprise a going direction and a returning direction.

3. An apparatus according to claim 2, further comprising outputting means for producing and outputting information which indicates whether said scanning direction is the going direction or the returning direction.

4. An apparatus according to claim 1, wherein said correcting means changes correction coefficients, which are used to correct the color tone of the image signal, based on an output of said control means.

5. An apparatus according to claim 1, wherein said correcting means corrects the color tone of the image signal based on combined characteristics of said light receiving means and said transfer means.

6. An apparatus according to claim 1, wherein said light receiving means comprises a plurality of light receiving units corresponding to a plurality of color components, and said transfer means comprises a plurality of transfer units.

7. An apparatus according to claim 1, which operates in both a two-sided reading mode and a one-sided reading mode;
   wherein in said two-sided reading mode, a front side of the original is scanned in a going direction and a back side of the original is scanned in a returning direction, and in said one-sided reading mode, the front side of said original is scanned in the going direction.

8. An apparatus according to claim 1, wherein said light receiving means comprises a plurality of light receiving units for receiving light having substantially same wavelengths; and wherein the light receiving units synthesize charges which correspond to received light using an intra-pixel transfer method.

9. An apparatus according to claim 1, wherein said correcting means executes a matrix calculation to correct the color tone of the image signal.

10. An apparatus according to claim 1, wherein the light receiving means comprises a plurality of light receiving units for receiving light having substantially same wavelengths; and wherein the light receiving units synthesize charges which correspond to received light using an intra-pixel transfer method.

11. An apparatus according to claim 1, wherein the correcting means executes a matrix calculation to correct the color tone of the image signal.

12. An image reading apparatus comprising:

light receiving means for receiving light obtained by scanning an original;

transfer means for transferring charges of the light received by said light receiving means, said transfer means for executing a transfer operation selected in accordance with a scanning direction; and control means for controlling the transfer means based on input information which is indicative of the scanning direction, wherein the input information is synchronized with other information which is indicative of the scanning direction and which is input to a color correcting means.

13. An apparatus according to claim 12, wherein said scanning direction comprises either a going direction or a returning direction.

14. An apparatus according to claim 12, wherein said correcting means corrects an image signal based on combined characteristics of said light receiving means and said transfer means.

15. An apparatus according to claim 12, wherein said light receiving means comprises a plurality of light receiving units corresponding to a plurality of color components, and said transfer means comprises a plurality of transfer units.

16. An apparatus according to claim 12, which operates in both a two-sided reading mode and a one-sided reading mode;

wherein in said two-sided reading mode, a front side of the original is scanned in a going direction and a back side of the original is scanned in a returning direction, and in said one-sided reading mode, the front side of said original is scanned in the going direction.

17. An apparatus according to claim 10, wherein said light receiving means comprises a plurality of light receiving units for receiving light having substantially same wavelengths; and wherein the light receiving units synthesize charges which correspond to received light using an intra-pixel transfer method.

18. An image reading apparatus comprising:

scanning means for scanning an original in different scanning directions;

light receiving means, which includes different channels, for receiving light from the original;

transfer means for transferring an image signal from the light receiving means, the transfer means transferring the image signal from different channels of the light receiving means in accordance with a scanning direction of the scanning means;

correcting means for correcting a color tone of the image signal transferred by the transfer means; and control means for controlling correction performed by said correcting means in accordance with the scanning direction.

19. An apparatus according to claim 18, wherein the scanning directions comprises either a going direction or a returning direction.

20. An apparatus according to claim 18, further comprising outputting means for producing, and outputting to the correcting means, information which indicates whether the scanning direction is the going direction or the returning direction.

21. An apparatus according to claim 18, wherein the correcting means changes correction coefficients used to correct the color tone of the image signal.

22. An apparatus according to claim 18, wherein the correcting means corrects an image signal based on combined characteristics of the light receiving means and the transfer means.

23. An apparatus according to claim 18, wherein the light receiving means comprises a plurality of light receiving units corresponding to a plurality of color components, and the transfer means comprises a plurality of reading units.

24. An apparatus according to claim 18, which operates in both a two-sided reading mode and a one-sided reading mode;

wherein in the two-sided reading mode, a front side of the original is scanned in a going direction and a back side of the original is scanned in a returning direction, and in the one-sided reading mode, the front side of the original is scanned in the going direction.

25. An image reading apparatus for scanning an original in different scanning directions, comprising:

light receiving means for receiving light from the original;

transfer means for transferring charges of light received by the light receiving means, the transfer means for executing a transfer operation selected in accordance with a scanning direction of the apparatus;

operation means for performing a mathematical operation on an image signal output from the transfer means; and control means for controlling the mathematical operation performed by the operation means in accordance with the scanning direction.

26. An apparatus according to claim 25, wherein the different scanning directions comprise a going direction and a returning direction.

27. An apparatus according to claim 26, further comprising outputting means for producing and outputting information which indicates whether the scanning direction is the going direction or the returning direction.

28. An apparatus according to claim 25, wherein the operation means changes operation coefficients which are used to perform the mathematical operation on the image signal, based on an output of the control means.

29. An apparatus according to claim 25, wherein the operation means performs the mathematical operation on the image signal based on combined characteristics of the light receiving means and the transfer means.

30. An apparatus according to claim 25, wherein the light receiving means comprises a plurality of light receiving units corresponding to a plurality of color components, and the transfer means comprises a plurality of transfer units.

31. An apparatus according to claim 25, wherein the apparatus operates in both a two-sided reading mode and a one-sided reading mode;

wherein in the two-sided reading mode, a front side of the original is scanned in a going direction and a back side of the original is scanned in a returning direction; and wherein in the one-sided reading mode, the front side of the original is scanned in the going direction.

32. An apparatus according to claim 25, wherein the light receiving means comprises a plurality of light receiving units for receiving light having substantially same wavelengths; and wherein the light receiving units synthesize charges which correspond to received light using an intrapixel transfer method.

33. An apparatus according to claim 25, wherein the mathematical operation performed by the operation means comprises a matrix calculation.

34. An image reading apparatus comprising:

scanning means for scanning an original in different scanning directions;

light receiving means, which includes different channels, for receiving light from the original;

transfer means for transferring an image signal from the light receiving means, the transfer means transferring the image signal from different channels of the light receiving means in accordance with a scanning direction of the scanning means;

operation means for performing a mathematical operation on the image signal transferred by the transfer means; and control means for controlling the mathematical operation performed by the operation means in accordance with the scanning direction.

35. An apparatus according to claim 34, wherein the scanning direction comprises either a going direction or a returning direction.

36. An apparatus according to claim 34, further comprising outputting means for producing, and outputting to the operation means, information which indicates whether the scanning direction is the going direction or the returning direction.

37. An apparatus according to claim 34, wherein the operation means changes operation coefficients used to perform the mathematical operation on the image signal.

38. An apparatus according to claim 34, wherein the operation means performs the mathematical operation on the image signal based on combined characteristics of the light receiving means and the transfer means.

39. An apparatus according to claim 34, wherein the light receiving means comprises a plurality of light receiving units corresponding to a plurality of color components, and the transfer means comprises a plurality of transfer units.

40. An apparatus according to claim 34, which operates in both a two-sided reading mode and a one-sided reading mode;

wherein in the two-sided reading mode, a front side of the original is scanned in a going direction and a back side of the original is scanned in a returning direction; and wherein in the one-sided reading mode, the front side of the original is scanned in the going direction.

41. An image reading apparatus comprising:

a) a plurality of sensors for converting light from an object into an image signal;

b) matrix operation means for correcting a signal level of the image signal; and c) control means for controlling said matrix operation means so as to change a matrix coefficient of said matrix operation means according to a direction of relative movement between said object and said plurality of sensors.

42. An apparatus according to claim 41, wherein said direction of the relative movement includes both a forward direction and a backward direction.

43. An apparatus according to claim 41, wherein said plurality of sensors comprises a plurality of light receiving units corresponding to a plurality of color components and transfer means, said transfer means comprising a plurality of transfer units.

44. An apparatus according to claim 41, operable in both a two-sided reading mode and a one-sided reading mode, wherein, in said two-sided reading mode, a front side of the object is scanned in a forward direction and a back side of the object is scanned in a backward direction, and wherein, in said one-sided reading mode, the front side of the object is scanned in the forward direction.

45. An apparatus according to claim 41, wherein said plurality of sensors comprise a plurality of light receiving units for receiving light having substantially same wavelengths, and wherein the plurality of light receiving units synthesize charges which correspond to received light using an intrapixel transfer method.

* * * * *

UNITED STATES PATENT AND TRADEMARK OFFICE
CERTIFICATE OF CORRECTION

PATENT NO. : 5,903,363

DATED : May 11, 1999

INVENTORS : HIROYUKI YAGUCHI et al.

It is certified that error appears in the above-identified patent and that said Letters Patent is hereby corrected as shown below:

COLUMN 9

Line 38, "all" should read --a11--.

COLUMN 11

Line 48, "claim 10," should read --claim 12,--.

Signed and Sealed this

Eighteenth Day of January, 2000

Attest:

Attesting Officer

Q. TODD DICKINSON

Commissioner of Patents and Trademarks